United States Patent [19]
Barsotti et al.

[11] Patent Number: 5,726,249
[45] Date of Patent: Mar. 10, 1998

[54] COATING COMPOSITIONS WITH BRANCHED POLYMER

[75] Inventors: Robert John Barsotti, Franklinville, N.J.; Christopher Scopazzi, Wilmington, Del.

[73] Assignee: E. I. du Pont de Nemours and Company, Wilmington, Del.

[21] Appl. No.: 765,374

[22] PCT Filed: Jun. 16, 1995

[86] PCT No.: PCT/US95/07122

§ 371 Date: Jan. 3, 1997

§ 102(e) Date: Jan. 3, 1997

[87] PCT Pub. No.: WO96/01852

PCT Pub. Date: Jan. 25, 1996

[51] Int. Cl.$^6$ .............................. C08F 2/38; C08F 290/04
[52] U.S. Cl. ..................... 525/286; 525/532; 525/533; 526/171; 526/172; 526/328; 526/328.5

[58] Field of Search ........................... 525/286, 532, 525/533; 526/171, 172, 328, 328.5

[56] References Cited

U.S. PATENT DOCUMENTS 5,244,944  9/1993  Bott et al. ........................ 523/461

FOREIGN PATENT DOCUMENTS 2060654  5/1981  United Kingdom.

*Primary Examiner*—Irina S. Zemel

[57] ABSTRACT

In coating compositions based on a low molecular weight anhydride resin having pendant non-cyclic anhydride moieties, epoxy resin containing glycidyl methacrylate and catalyst, the use of branched epoxy resin provides an improved balance of performance characteristics.

10 Claims, No Drawings

COATING COMPOSITIONS WITH BRANCHED POLYMER

BACKGROUND OF THE INVENTION

The present invention relates to a curable coating composition particularly useful as a top coat in multi-layered coating systems.

Base coat-clear coat systems have found wide acceptance in the past decade as automotive finishes. Continuing effort has been directed to such coating systems to improve the overall appearance, the clarity of the top coat, and the resistance to deterioration. Further effort has been directed to the development of coating compositions having low volatile organic content (VOC).

Previous efforts at improving the etch resistance and durability of coatings had suggested the use of anhydride resins having pendant non-cyclic anhydride moieties in combination with resins that react with the polyanhydride resins to cure under curing conditions. However, a continuing need exists for coating formulations which provide outstanding performance characteristics after application, and particularly resistance to environmental etching.

SUMMARY OF THE INVENTION

The present invention provides a sprayable coating composition which, through the selection of the chemical makeup and molecular weight of the components, provides a fully formulated coating composition which exhibits ease of application, outstanding appearance and durability after application and ease of maintenance.

Specifically, the instant invention provides a sprayable, curable, coating composition comprising organic solvent and binder, the binder comprising:

(a) anhydride resin having a molecular weight of less than about 3,000 that contains (1) a central moiety, and (2) on average, more than one pendant, non-cyclic arthydride moiety bonded to each central moiety;

(b) coreactant branched copolymer resin having a molecular weight of about from 1500 to 50,000 comprising:
  (i) a polymeric backbone comprising about from 5 to 75%, based on the weight of the backbone, of polymerized ethylenically unsaturated monomers containing epoxy functionality; and
  (ii) about from 1 to 80%, by weight of the branched polymer, of macromonomers containing epoxy functionality attached to said polymeric backbone at a single terminal point of said macromonomer;
wherein the branched copolymer resin contains at least about 10% by weight of ethylenically unsaturated monomers containing epoxy functionality; and (c) a functional amount of at least one catalyst, wherein the ratio of equivalents of epoxy to anhydride is about from 0.5 to 1.8.

DETAILED DESCRIPTION OF THE INVENTION

The coating compositions of the present invention comprise an anhydride resin, a co-reactant epoxy resin, and a latent catalyst, each as described below.

Anhydride resins which can be used in the present invention include those having a molecular weight of less than about 3000 having a central moiety and more than one pendant, non-cyclic anhydride moiety bonded to each central moiety. The anhydride is asymmetrical, and preferably contains a moiety represented by the following formula:

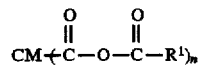

wherein (CM) is a central moiety, ($R^1$) is an organic moiety, and n is a number of pendant anhydride groups that averages greater than one.

The central moiety can be a simple organic moiety, such as an aliphatic, cycloaliphatic or aromatic moiety, with a plurality of anhydride groups bonded to it. Alternatively, it can contain a plurality of repeating units which are bonded to one or more pendant anhydride groups. Examples of suitable non-polymeric central moieties are those derived from multifunctional alcohols such as pentaerythritol, trimethylolpropane and neopentyl glycol. The multifunctional alcohols are reacted with cyclic, monomeric anhydride such as methyl hexahydrophthalic anhydride to give a multifunctional acid containing moiety. The resulting product is then reacted with ketene to form the linear pendant anhydride.

The central moiety is linked to more than one non-cyclic anhydride moiety, on average. It is preferably linked to at least about 2 non-cyclic anhydride groups on average and more preferably to at least about 3 non-cyclic anhydride groups on average. The anhydride equivalent weight (formula weight per anhydride group) is preferably at least about 200 and preferably no more than about 1000.

Each anhydride moiety is typically terminated by an organic group ($R^1$). This group is preferably aliphatic and more preferably alkyl. It preferably contains no more than about 6 carbon atoms, more preferably no more than about 4 carbon atoms, and most preferably methyl.

The oligomeric anhydride can optionally contain a polyvalent organic moiety (A) that is linked to a plurality of anhydride groups by a plurality of pendant linking groups (LG), as illustrated in the following formula:

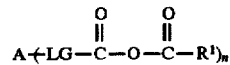

The linking group (LG) can contain, for example, ester linkages, alkylene groups, ether linkages, urethane linkages and combinations of those. The polyvalent organic group can contain, for example, a polyvalent alkyl or aromatic group. The combination of the polyvalent organic moiety (A) and the linking groups (LG) forms the central moiety (CM) as previously described.

The central moiety can optionally contain other functional groups in addition to the pendant non-cyclic anhydride groups. For example, the central moiety may contain pendant acid groups, so that the anhydride is represented by the formula:

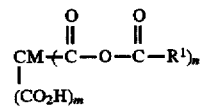

wherein m is the number of pendant acid groups and all other characters have the meaning previously given. The molar ratio of pendant non-cyclic anhydride groups to pendant acid groups in the oligomeric anhydride is preferably at least about 25:75, more preferably at least about 50:50, and more highly preferably at least about 75:25. Most preferably, the anhydride contains substantially no pendant acid groups. The central moiety can also contain minor quantities of cyclic anhydride moieties.

The molecular weight of the anhydride resin should be less than about 3000. At molecular weights of the oligomeric anhydride greater than 3000, it is difficult to attain a sprayable composition with a volatile organic content of less than about 3.5 pounds of organic solvent per gallon of curable compositions. The molecular weight of the anhydride resin is preferably less than about 2000, and especially about from 400 to 1,000. The anhydride resin preferably has 3 to 4 pendant, non-cyclic anhydride moieties bonded to each central moiety.

A second component of the present formulation is a coreactant branched copolymer. An important feature of the epoxy resins used in the present invention is that the resin comprise at least about 10 wt % copolymerized ethylenically unsaturated monomer containing epoxy functionality. In addition, the coreactant branched copolymer should be substantially free from acid functionality and have a branched configuration. By branched is meant that the oligomeric chains, or macromonomers, attached to the polymeric backbone are attached at a single terminal point.

The coreactant branched copolymer used in the present invention has a weight average molecular weight of about from 1500 to 50,000, preferably about from 2500 to 20,000. All molecular weights disclosed herein are determined by gel permeation chromatography using a polystyrene standard. Linear film-forming polymers, preferably 0 to 55 percent by weight (and concomitantly 45 to 100% by weight of the branched copolymer), based on the weight of the binder, can also be used in conjunction with the branched copolymer.

The coreactant branched copolymer can be prepared by polymerizing ethylenically unsaturated monomers in the presence of macromonomers each having a terminal ethylene unsaturation of branching. The resulting polymer can be represented as being composed of a backbone having a plurality of macromonomer "arms" attached thereto. In the present composition, both the macromonomer arms and the backbone can each optionally have reactive functionalities capable of reacting with a crosslinking compound or polymer. The macromonomers referred to as having epoxy functionality may be part of a mixture of macromonomers of which a portion do not have any epoxy functionality or variable mounts of epoxy functionality. In addition, in preparing any macromonomers, there is a normal distribution of functionality.

In a preferred process of preparing the coreactant branched copolymers used in the present invention, cobalt chain transfer is used in the first step of a two step process. This first step typically involves polymerizing, in an inert organic solvent, a mixture of ethylenically unsaturated monomers using a catalytic chain transfer agent, preferably containing $Co^{+2}$ or $Co^{+3}$, to obtain macromonomers. The mixture of monomers may comprise from zero to about 75 percent, based on the weight of the macromonomers, of ethylenically unsaturated monomers containing epoxy functionality (and concomitantly 25 to 100 percent, by weight of said macromonomers, of ethylenically unsaturated monomers not containing epoxy functionality). The precise amount of epoxy functionality in the macromonomer may depend on the particular application.

As indicated above, the preferred catalytic chain transfer agent is a compound which contains $Co^{+2}$ or $Co^{+3}$. Exemplary cobalt chelates are those described in U.S. Pat. No. 4,680,352 to Janowicz et al. and U.S. Pat. No. 4,722,984 to Janowicz. Most preferred chelates are pentacyanocobaltate (II), diaquabis(borondifluorodimethyl-glyoximato) cobaltate (II) and diaquabis(borondifluorodiphenylglyoximato) cobaltate (II). $Co^{+3}$ catalysts are described in PCT Patent Application WO87/03605. Such chain transfer agents are ordinarily used at concentrations of 5–150 ppm based on the monomers.

Typically, a mixture of monomers and organic liquid is heated, preferably to reflux temperature for ease of control, and to the mixture is added the catalytic chain transfer agent of choice, additional monomers and solvent, and the usual amount of a conventional polymerization initiator such as an azo- or peroxide initiator. The reaction is rim, with additions of monomers and initiator as needed, until the desired macromonomers are obtained having the desired molecular weight. In general, these molecular weights (Mw) are about from 2,000 to 30,000 and preferably about from 3,000–10, 000. Solvents which can be used are aromatic and aliphatic hydrocarbons, esters, ketones and mixtures thereof.

The second step in the preferred process of preparing the branched copolymer involves forming a polymeric backbone by polymerizing, in an organic solvent, in the presence of said previously prepared macromonomers, another mixture of ethylenically unsaturated monomers comprising 5 to 75 percent, preferably 15 to 40 percent, based on the weight of the backbone, of polymerized ethylenically unsaturated monomers containing a reactive epoxy functionality (and concomitantly 25 to 95 percent, preferably 60 to 85 percent, based on the weight of the backbone, of polymerized ethylenically unsaturated monomers not containing a epoxy functionality). This polymerization, whereby the backbone of the branched polymer is formed, may employ any free radical or vinyl addition polymerization reaction process, and does not necessarily require a chain transfer agent. A typical vinyl addition polymerization reaction is usually conducted at a temperature within the range of about 125° C. to about 200°C. preferably 140° C. to 160° C.

The monomer make-up of the macromonomers and the backbone need not be the same, and, in fact, diverse properties such as Tg's may be desirable. It may also be desirable to have higher amounts of styrene in the backbone.

During polymerization of the backbone, there is generally present a free radical initiator which is selected from a wide variety of materials. Suitable types of materials include peroxides, hydroperoxides and azo initiators. Examples of these types of initiators include di-tertiarybutyl peroxide, di-cumylperoxide; amyl peroxyacetate; cumenehydroperoxide; 2,5-dimethyl-2,5-bis(tertiarybutylperoxy) hexane; hexyne-3-tertiarybutyl cumylperoxide; tertiaryamyl peroxide; 2,5-dihydroperoxy-2,5-dimethyl hexane, di (n-propyl) peroxydicarbonate and 2,2'-azobis (2,4-dimethyl-4-methoxyvaleronitrile).

The amount of initiator can vary widely, although usually it is present in an amount ranging from about 3 percent to about 8 percent, the percentage based on the total weight of the vinyl monomer component. Generally, there is also present during the vinyl addition polymerization a solvent which assists in maintaining the preferred reaction temperature. Typical solvents and diluents include toluene, xylene, butyl acetate, acetone, methyl isobutyl ketone, methyl ethyl ketone, ethyl amyl ketone, methanol, isopropanol, butanol, hexane, acetone, ethylene glycol monoethyl ether, VM and P naptha, mineral spirits, heptane and other aliphatic, cycloaliphatic, aromatic hydrocarbons, aromatic petroleum distillates, esters, ethers and ketones, and the like.

This branched epoxy resin can comprise copolymerized monomers of alkyl methacrylates, or alkyl acrylates or mixtures thereof, where the alkyl groups have 1–12 carton atoms. Optionally, the acrylic polymer can contain other components such as styrene, alphamethyl styrene, acrylonitrile, methacrylonitrile in amounts of about 0.1–50% by weight.

Typical alkyl acrylates and methacrylates that can be used to form the branched acrylic polymer include methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the acrylic polymer are acrylamide, methacrylamide and acrylo alkoxy silanes such as gamma methacrylyl propyl trimethoxy silane.

The relative concentrations of the anhydride resin and the epoxy resin can vary widely. However, the ratio of equivalents of epoxy to anhydride should be about from 0.5 to 1.8.

The compositions of the present invention further comprise at least one catalyst. For a one-package system, a latent catalyst is used. In the context of the present invention, latent catalyst is understood to mean a catalyst which has little or no effect on the ingredients with which it is blended at ambient or storage conditions, but which promotes the reaction of these components at elevated temperatures or when applied to a substrate. While a wide variety of such catalysts can be used, as will be evident to those skilled in the art, those found to be particularly satisfactory in the present invention include onium compounds such as those selected from the group consisting of quaternary phosphonium compounds, quaternary ammonium compounds and tertiary amines blocked with acids such as sulfonic acid and phosphoric acid. Catalysts which have been found particularly satisfactory include quaternary phosphonium salts such as tetrabutylphosphonium chloride or quaternary ammonium salts such as tetrabutylammonium halide, especially chloride. A functional amount of latent catalyst is used in the present formulations, and will vary widely, depending on the specific anhydride resin and epoxy resin selected, as well as their molecular weight and relative proportions. While the specific concentration of the latent catalyst will be selected in view of these variables, as evident to those skilled in the art, the quantities will generally be about from 0.1 to 5 wt %, based on the weight of the solids in the formulation. In the event that two-package coating systems are prepared, unblocked tertiary amine catalysts can be used.

The coating compositions of the present invention are formulated into high solids coating systems with at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate. The quantity of such solvent is adjusted, according to well-known techniques, to make the overall formulation sprayable.

In the preparation and storage of the single package coating formulations of the present invention, to provide for long term stability, compounds containing active hydrogen should be minimized, such as alcohols or water.

The coating compositions of the present invention can also contain conventional additives such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The coating compositions are typically applied to a substrate by conventional techniques such as spraying, electrostatic spraying, roller coating, dipping or brushing. The present formulations are particularly useful as a clear coating for outdoor articles, such as automobile and other vehicle body parts. The substrate is generally prepared with a primer and or a color coat or other surface preparation prior to coating with the present compositions. The present coating compositions can be applied using conventional techniques such as wet-on-wet applications over solvent borne basecoats, or over dried water borne basecoats.

After application to a substrate, the present compositions are cured by heating to a temperature of about from 120°C. to 140° C. for a period of about from 15 to 90 minutes.

The performance characteristics of the final cured coating composition are excellent, providing a combination of excellent gloss and durability to abrasion, sunlight and acidic rain. At the same time, the compositions provide ease of handling. The use of the branched copolymers in the present coating composition permits the use of lower concentrations of epoxy functionality as opposed to linear copolymers of the type previously used. In addition, the use of branched copolymer results in coating formulations having improved resistance to acids and salts, typical of those found in exterior weathering conditions. Such resistance to acids and salts is typically measured in industrial testing of coating formulations using elevated temperatures in conjunction with solutions of the acids and salts. Temperatures up to about 82° C. (180° F.) are conventionally used for such testing. The testing typically measures the depth to which the test solutions etch the test panel.

The present invention is further illustrated by the following specific examples, in which parts and percentages are by weight unless otherwise indicated. Molecular weight, as used herein, unless otherwise indicated, refers to weight average molecular weight, as determined by gas phase chromatography.

EXAMPLE 1

(a) Epoxy Polymer
Preparation of Macromonomer

To a 2-liter flask fitted with an agitator, condenser, heating mantle, nitrogen inlet, thermocouple and an addition port was added 325.2 gms. butyl methacrylate, 81.29 gms. glycidyl methacrylate, 160 gms. toluene and 100.1 gms. butyl acetate. The mixture was agitated and heated to reflux (135°–140° C.) under nitrogen. To this was then added, in one portion, a pre-mix of a solution of 0.35 gms. VazoO88, 13.8 gms. toulene and 17.2 gms. of a 0.17% solution of bis(Boron Difluoro Diphenyl Glyoximato Cobaltate (II)) in methyl ethyl ketone. This was followed by the addition of a pre-mix of a solution of 285.4 gms. butyl methacrylate, 71.34 gms. glycidyl methacrylate, 1.35 gms. Vazo® 88 and 86.8 gms. toluene over 240 minutes, while maintaining reflux (116°–122° C.). Following a 30 minutes hold period, a pre-mix solution of 0.32 gms. Vazo® 88 and 23.0 gms. toulene was added over 60 minutes while maintaining reflux. The batch was then held at reflux for an additional 60 minutes at which time a mixture of 0.23 gms. t-butyl peroctoate and 31.5 gms. of butyl acetate was added in one portion and the reaction mixture then cooled. The macromonomer thus prepared had a number average molecular weight of 3400 and a weight average molecular weight of 5400 as determined by gas phase chromatography (GPC). Weight solids were 63.6% and Gardner viscosity F. The percent terminal vinyl unsaturation was >95 as determined by thermogravimetric analysis.

Preparation of Branched Polymer

To a 2-liter flask fitted with an agitator, condenser, heating mantle, nitrogen inlet, thermocouple and an addition port was added 643.8 gms. of macromonomer prepared above. 82.4 gms. Solvesso® 100 and the temperature raised to 125° C. under nitrogen. This was followed by the addition of a premixed solution of 164.8 gms. glycidyl methacrylate, 82.4 gms. styrene, 82.4 gms. butyl methacrylate and 82.4 gms. butyl acrylate over 240 minutes. together with the addition of a solution of 20.6 gms. t-butyl peracetate and 41.2 gms. Solvesso® 100 over 255 minutes. holding temperature constant at 125° C. The batch was cooled following a hold period of 60 minutes. after the addition of initiator. Solids were 69% weight, Gardner Holdt viscosity Y, number average molecular weight 4940 and weight average molecular weight 8920 as determined by GPC.

(b) Linear Pendant Anhydride Resin

An anhydride resin was prepared from a tetra-functional half-acid ester. The following constituents were charged to a reaction vessel equipped with a heating mantle, reflux condenser, thermometer, nitrogen inlet, and stirrer:

|  | Parts by Weight |
|---|---|
| Portion 1 |  |
| Pentaerythritol | 478.0 |
| Methyl hexahydropthalic anhydride | 2250.0 |
| Triethylamine | 0.5 |
| Portion 2 |  |
| Xylol (135–145° C.) | 2250.0 |
| Total | 4978.5 |

Portion 1 was charged into the reaction vessel, heated to 180° C. under a nitrogen blanket and held for 30 minutes. After the hold period, the reaction mixture was cooled and Portion 2 added.

The solution prepared above was charged into a 5L flask equipped with a stirrer and a gas inlet tube. The gas inlet tube was attached to a ketene generator similar to the one described by Williams et al. in the Journal of Organic Chemistry 5,122, 1940. Ketene is bubbled through the solution until all of the acid groups have been converted to anhydride groups. Reaction progress is monitored via FTIR. Solvent was then removed under vacuum to give a linear pendant anhydride with the following characteristics:

% weight solids: 78.0

Anhydride eq. wt.: 329±4 (on solution basis)

Acid eq. wt.: 6176±1323 (on solution basis)

(c) Coating Composition

A coating composition was prepared by combining the epoxy polymer and the linear pendant anhydride with additional components in the following proportions:

| Components | Part by Weight |
|---|---|
| Linear Pendant Anhydride | 106.4 |
| Epoxy Polymer | 232.8 |
| Tinuvin 384 (UV screener from Ciba-Geigy) | 4.9 |
| Tinuvin 123 (HALS from Ciba-Geigy) | 3.6 |
| 50% Dislon-1984 flow additive in Xylene (King Ind.) | 1.1 |
| 25% tetrabutyl phosphonium chloride in PM Acetate | 2.4 |
| Butyl Acetate | 99 |

The coating composition was sprayed over prebaked waterborne basecoat (10 minutes at 82° C. (180° F.)) and cured at 30 minutes at 141° C. (285° F.). The resulting film had good appearance, hardness, chemical resistance. The wet clear was stable for at least one week at ambient conditions.

We claim:

1. A sprayable, curable, coating composition comprising organic solvent and binder, the binder comprising:
   (a) anhydride resin having a molecular weight of less than about 3,000 that contains (1) a central moiety, and (2) on average, more than one pendant, non-cyclic, asymmetrical anhydride moiety bonded to each central moiety;
   (b) coreactant branched copolymer resin having a molecular weight of about from 1500 to 50,000 comprising:
      (i) a polymeric backbone comprising about from 5 to 75%, based on the weight of the backbone, of polymerized ethylenically unsaturated monomers containing epoxy functionality; and
      (ii) about from 1 to 80%, by weight of the branched copolymer, of macromonomers containing epoxy functionality attached to the polymeric backbone at a single terminal point of the macromonomer;
   wherein the branched copolymer resin contains at least about 10% by weight of ethylenically unsaturated polymers containing epoxy functionality; and
   (c) a functional amount of at least one catalyst; wherein the ratio of equivalents of epoxy to anhydride is about from 0.5 to 1.8.

2. A composition of claim 1 wherein the backbone and the macromonomer in the coreactant branched copolymer are each present in a quantity of at least about 30% by weight of the coreactant branched copolymer.

3. A composition of claim 2 wherein the backbone and the macromonomer in the coreactant are present in substantially equal proportions.

4. A composition of claim 1 wherein the catalyst consists essentially of at least one onium compound.

5. A composition of claim 1 wherein the catalyst is selected from at least one compound of the group consisting of quaternary phosphonium compounds, quaternary ammonium compounds and tertiary amines.

6. A substrate coated with the composition of claim 1.

7. A coated substrate of claim 6 wherein the applied curable composition is substantially free from pigment.

8. A process for making the coating composition of claim 1 comprising
   (a) preparing macromonomers, in an organic solvent, by polymerizing, using a catalytic chain transfer agent containing $Co^{+2}$ or $Co^{+3}$, ethylenically unsaturated monomers comprising about from 5 to 95% by weight, based on the weight of the macromonomers, of ethylenically unsaturated monomers containing epoxy functionality; and
   (b) forming, in an organic solvent, the branched copolymer by polymerizing, in the presence of the macromonomers prepared in (a) above, ethylenically unsaturated monomers to form a backbone, whereby the macromonomers are incorporated into the backbone at a single terminal point of the macromonomers, such attachment to the backbone occurring by the reaction of a terminal ethylene unsaturation on each of the macromonomers with monomers which polymerize to form the backbone.

9. A process according to claim 8 wherein the chain transfer agent is a $Co^{+2}$ chelate.

10. A process according to claim 9, wherein the chelate is selected from the group consisting of pentacyano cobaltate (II), diaquabis (borondifluorodimethyl-glyoximato) cobaltate (II) and diaquabis (borondifluorodiphenylglyoximato) cobaltate (II).

* * * * *